US006633466B2

United States Patent
Sakaguci et al.

(10) Patent No.: US 6,633,466 B2
(45) Date of Patent: Oct. 14, 2003

(54) MR THIN FILM HEAD WITH LONGITUDINAL-BIASING MULTI-LAYERS OF ANTIFERROMAGNETICALLY-COUPLED HIGH AND LOW COERCIVITY LAYERS

(75) Inventors: Masaya Sakaguci, Osaka (JP); Toshio Fukazawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 217 days.

(21) Appl. No.: 09/737,091

(22) Filed: Dec. 14, 2000

(65) Prior Publication Data

US 2001/0028540 A1 Oct. 11, 2001

(30) Foreign Application Priority Data

Dec. 14, 1999  (JP) .......................................... 11-354299

(51) Int. Cl.[7] .................................................. G11B 5/39
(52) U.S. Cl. ............................. 360/327.31; 360/324.12
(58) Field of Search ........................ 360/327.31, 327.32, 360/327.3, 324.12, 324.11

(56) References Cited

U.S. PATENT DOCUMENTS 5,465,185 A * 11/1995 Heim et al.
5,896,252 A * 4/1999 Kanai
6,266,218 B1 * 7/2001 Carey et al. ........... 360/324.12

* cited by examiner

*Primary Examiner*—Craig A. Renner
(74) *Attorney, Agent, or Firm*—RatnerPrestia

(57) ABSTRACT

A thin film head includes a GMR element formed of an antiferromagnetic layer, a pinning layer, a nonmagnetic conductive layer, a free magnetic layer, and a pair of the right and the left laminated longitudinal biasing layers. Each of the biasing layers contains a high coercivity ferromagnetic layer, a nonmagnetic layer and a low coercivity ferromagnetic layer provided on the free magnetic layer of the GMR element. The high coercivity ferromagnetic layer and low coercivity ferromagnetic layer are antiferromagnetically exchange-coupled via the nonmagnetic layer, and the high coercivity ferromagnetic layer and free magnetic layer located next to the high coercivity ferromagnetic layer are ferromagnetically coupled.

7 Claims, 17 Drawing Sheets

US 6,633,466 B2

MR THIN FILM HEAD WITH LONGITUDINAL-BIASING MULTI-LAYERS OF ANTIFERROMAGNETICALLY-COUPLED HIGH AND LOW COERCIVITY LAYERS

FIELD OF THE INVENTION

The present invention relates to a magnetoresistive thin film head for use in hard disk drives (HDD) or other such magnetic recording apparatus which record signals on magnetic recording media in high density, and reproduce the signals therefrom; more specifically, a magnetoresisitive thin film head in which the free magnetic layer of magnetoresistive element is provided with stable and effective biasing magnetic fields, for yielding signals of reduced noise yet having a high reproducing sensitivity. The present invention relates also to a method for manufacturing the magnetoresistive thin film head.

BACKGROUND OF THE INVENTION

The needs for higher processing speed and greater recording capacity are growing among HDDs and other apparatus for recording signals on magnetic recording media. A considerable number of activities are observed for satisfying the needs. For the high density recording, HDDs employ a thin film head; in which an inductive head is used for recording signals, and a magnetoresistive head (MR head), or a giant MR head (GMR head), is used for reproducing signals.

A conventional thin film head is described below referring to drawings.

FIG. 16 is a perspective view showing the outline at the sliding surface of a conventional thin film head facing a recording medium. FIG. 17 shows an outline front view of the thin film head.

A lower gap layer 162 of $Al_2O_3$, AlN, $SiO_2$ or other nonmagnetic insulating material is formed on a lower magnetic shield layer 161 made of a soft magnetic material such as Permalloy, a Co amorphous magnetic layer, an Fe alloy magnetic layer. On top of the upper surface, a magnetoresistive element 163 (an MR element or a GMR element, hereinafter both are collectively referred to as GMR element) is deposited, and a longitudinal biasing layer 164 is formed by a CoPt alloy or other such material at both the right and the left ends of the GMR element 163. A lead layer 165 of conductive material such as Cu, Cr, Ta, etc. is provided on the upper surface of the longitudinal biasing layer 164 so that the lead layer 165 makes contact with a ridge line formed by the upper surface of the GMR element 163 and the end faces. The lead layer 165 may be disposed instead on the upper surface of the longitudinal biasing layer 164 SO that it covers part of the upper surface of the GMR element 163. Next, an upper gap layer 166 is formed over the lead layer 165 and the exposed region of the GMR element 163, using the same nonmagnetic insulating material as the lower gap layer 162. Further on top of the upper gap layer 166, an upper magnetic shield layer 167 is provided using the same soft magnetic material as the lower magnetic shield layer 161. This completes the reproducing part 168 of a magnetoresistive head.

On the upper surface of the upper magnetic shield layer 167, a recording gap layer 171 is formed using the same nonmagnetic insulating material as the lower gap layer 162. An upper magnetic core 172, which faces to the upper magnetic shield layer 167 via the recording gap layer 171 and makes contact with the upper magnetic shield layer 167 at the rear scene of FIG. 16, is provided in the form of a layer using a soft magnetic material. Between the upper magnetic shield layer 167 and the upper magnetic core 172 facing to each other with the interposing recording gap layer 171, a coil 173 is provided electrically isolated from both the upper magnetic shield layer 167 and the upper magnetic core 172. This completes the recording part 170 of a magnetoresistive thin film head. The upper magnetic shield layer 167 works as the shield for the reproducing part 168 and as the lower magnetic core of the recording part 170.

Recording current supplied to the coil 173 generates recording magnetic fields in the recording gap layer 171 disposed between the upper magnetic core 172 and the upper magnetic shield layer 167 of the recording head 170, for recording the signals on a magnetic recording medium. The reproducing head 168 detects signal magnetic fields from a magnetic recording medium storing the signals, and signals reproduced by the GMR element 163 in accordance with the resistance shift are taken out through the terminal of lead layer 165.

FIG. 17 shows outline front view of the reproducing part in the vicinity of magnetoresistive element of the above-described thin film head. A lower gap layer 162 is provided on the upper surface of the lower magnetic shield layer 161. On top of it, an antiferromagnetic layer 174 formed of a magnetic material such as IrMn, an FeMn alloy, a PtMn alloy, $\alpha Fe_2O_3$, or NiO; a pinning layer 175 formed of a magnetic material such as a NiFe alloy, Co, a CoFe alloy; a nonmagnetic conductive layer 176 formed of a nonmagnetic conductive material such as Cu; a free magnetic layer 177 formed of the same material as the pinning layer; and an upper cap layer 166 formed of a nonmagnetic material such as Ta; are deposited sequentially. The laminated body of stacked layers is defined at both the right and the left ends by ion-milling or the like method so that each of the cut ends has a slant surface. Thus a GMR element 163 is provided.

A pair of longitudinal biasing layers 164 are formed at both ends of the GMR element 163 in physical contact with the slant end surfaces, and a pair of the right and the left lead layers 165 are provided on the longitudinal biasing layers. On top of them, an upper gap layer 166 is formed, followed by an upper magnetic shield layer 167. Thus the reproducing part 168 of a magnetoresistive thin film head is completed. Gap length 179 of the reproducing part 168 represents a total sum in the thickness of the lower gap layer 162, the GMR element 163 and the upper gap layer 166. The gap length 179 is becoming smaller, so that it is capable of reproducing the short-wavelength signals of high density recording.

With the reproducing part of the above-configured thin film head, in order to be able to reproduce the short-wavelength signals stored in a magnetic recording medium, gap length of the reproducing part needs to be sufficiently short. As described earlier, the gap length is a distance between the upper surface of the lower magnetic shield layer and the lower surface of the upper magnetic shield layer. It means that the distance is represented by a total thickness of the lower gap layer, the GMR element and the upper gap layer. The short distance means that the pair of longitudinal biasing layers disposed at both the right and the left ends of the GMR element are existing very close to the lower magnetic shield layer or the upper magnetic shield layer. Under which circumstance, magnetic fields of the longitudinal biasing layers easily escape to the lower magnetic shield layer or the upper magnetic shield layer. As a result, magnetic coupling between the longitudinal biasing layer and the free magnetic layer of GMR element becomes weak and the direction of magnetization of the free magnetic layer is not orientated in a stable manner, and noise generation increases. Thus it is difficult for a thin film head of the conventional structure to yield stable reproducing signals. The reduced width of recording track for the high-density recording brings about a minimized spacing between the pair of the right and the left longitudinal biasing layers. Under such a situation, if magnetic field of the longitudinal biasing layer is made stronger, the free magnetic layer of GMR element receives a too strong magnetic field from the longitudinal biasing layer. This leads to a problem that it makes it difficult for a free magnetic layer to change the magnetization direction in response to signal magnetic field; deteriorating sensitivity of the reproduction. Another still greater problem is that the magnetization direction of pinning layer is prone to assume the direction of track width by the influence of longitudinal biasing magnetic field.

SUMMARY OF THE INVENTION

The present invention addresses the above described problems and aims to solve them. A hard magnetic layer formed on a free magnetic layer of GMR element is ferromagnetically coupled with said free magnetic layer, and a soft magnetic layer formed to face said hard magnetic layer via a nonmagnetic layer is antiferromagnetically exchange-coupled with said hard magnetic layer. By so doing, the free magnetic layer is provided with stable longitudinal biasing magnetic field, and magnetization direction of the free magnetic layer is stabilized. Thus the present invention offers a magnetoresistive head of superior reproducing performance that exhibits reproduction signals of good symmetry at a suppressed Barkhausen noise. The present invention also contains in it a method for manufacturing the magnetoresistive head.

The thin film head of the present invention comprises a magnetoresistive element provided between a lower magnetic shield layer and an upper magnetic shield layer with an insulating layer interposed, a longitudinal biasing layer provided in physical contact with said GMR element, and a lead layer for supplying signal current. In which, the GMR element contains an antiferromagnetic layer, a pinning layer, a nonmagnetic conductive layer and a free magnetic layer; and the longitudinal biasing layer is provided in the form of a pair of the right and the left laminated longitudinal biasing layers deposited on the free magnetic layer of GMR element, each of the laminated layers containing a hard magnetic layer, a nonmagnetic layer and a soft magnetic layer.

Also, in the above-described configuration, the pinning layer of magnetoresistive element is provided as a laminated pinning layer consisting of a plurality of magnetic layers each stacked one another via a nonmagnetic layer. Furthermore, the free magnetic layer of magnetoresistive element is provided as a laminated free magnetic layer consisting of magnetic layers, where respective soft magnetic materials used for the adjacent layers are different to each other.

DETAILED DESCRIPTION OF THE EXEMPLARY EMBODIMENTS

Figure 1A:
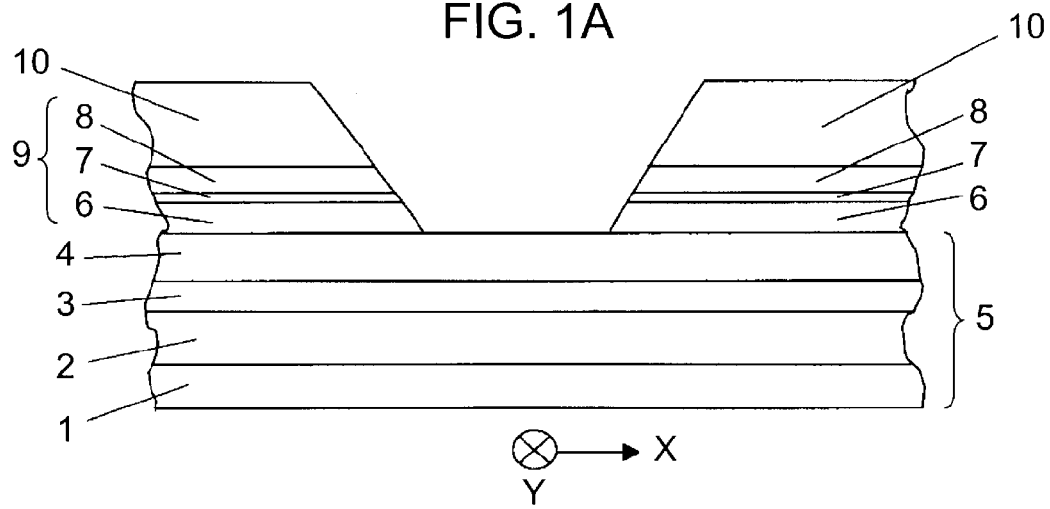
FIG. 1 Front outline view showing the structure, in the vicinity of magnetoresistive element, of a thin film head in accordance with a first exemplary embodiment of the present invention.

A first exemplary embodiment of the present invention is described referring to FIG. 1.

FIG. 1 shows the structural concept of a thin film head in accordance with embodiment 1 of the present invention; a portion in the vicinity of GMR element as viewed from the sliding surface facing a magnetic recording medium. A lower gap layer (not shown) of $Al_2O_3$, AlN, $SiO_2$, or other nonmagnetic insulating material is formed on a lower magnetic shield layer (not shown) formed of a soft magnetic material such as Permalloy, a Co amorphous magnetic layer, an Fe fine grain magnetic layer. On top of the lower gap layer, an antiferromagnetic layer 1 formed of a material such as IrMn, an FeMn alloy, a PtMn alloy, $\alpha Fe_2O_3$, NiO; a pinning layer 2 formed of a magnetic material such as a NiFe alloy, Co, a CoFe alloy; a nonmagnetic conductive layer 3 formed of Cu or other nonmagnetic conductive material; and a free magnetic layer 4 formed of the same ferromagnetic material as the pinning layer 2 are deposited sequentially to constitute a GMR element 5.

Further, on the upper surface of the free magnetic layer 4, which being a constituent of the GMR element 5, a pair of the right and the left laminated longitudinal biasing layers 9 are provided, each consisting of a high coercivity ferromagnetic layer 6 (hereinafter referred to as "hard magnetic layer 6") formed of a CoPt alloy or other magnetic material, a nonmagnetic layer 7 of Ru or other nonmagnetic material and a low coercivity ferromagnetic layer 8 (hereinafter referred to as "soft magnetic layer 8") of the same magnetic material as the free magnetic layer 4. Magnetization direction of the free magnetic layer 4 is orientated to the same magnetization direction as the hard magnetic layer 6, by ferromagnetic coupling with the hard magnetic layer 6 formed thereon, and it is kept in a stable state. Magnetization direction of the hard magnetic layer 6 is antiferromagnetically exchange-coupled with the soft magnetic layer 8, which layer is facing to the hard magnetic layer 6 via the nonmagnetic layer 7. The magnetization direction is maintained in a stable state. On top of the laminated longitudinal biasing layer 9, a pair of the right and the left lead layers 10 of a conductive material such as Cu, Cr, Ta are provided. Further on top of it, an upper gap layer (not shown) is formed using the same insulating material as the lower gap layer to cover entirely. Still further on top of it, an upper magnetic shield layer (not shown) is formed using the same soft magnetic material as the lower magnetic shield layer to complete the reproducing part of a thin film head.

Figure 1B:
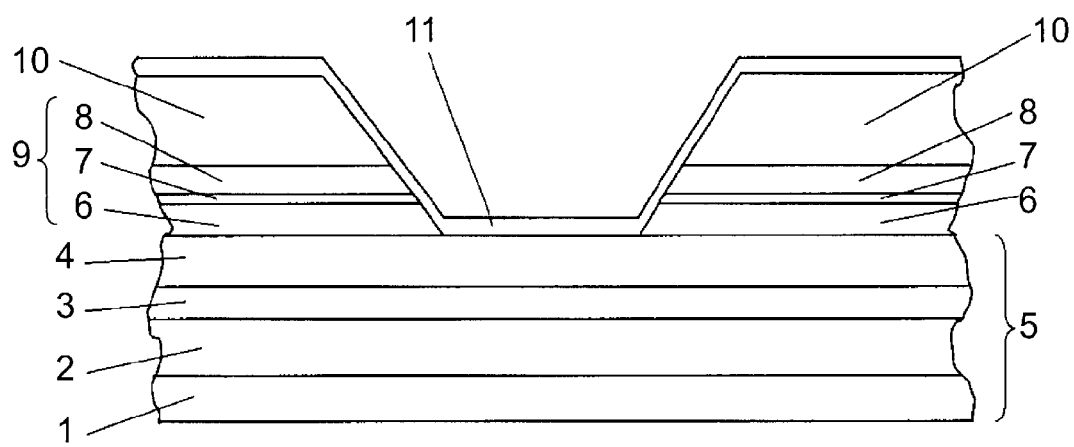
Figure 1C:
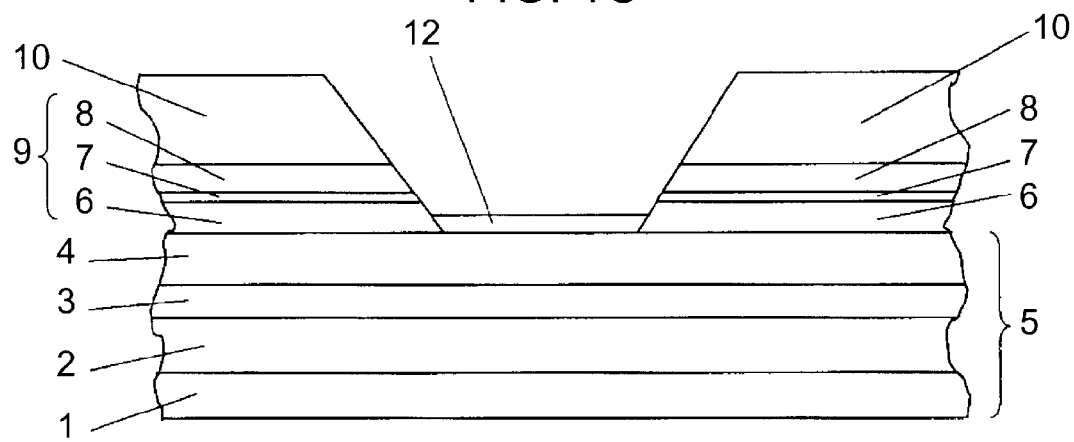

For the purpose of protecting the free magnetic layer 4 against corrosion, a cap layer 11 may be formed, as shown in FIG. 1(b), using Ta or other nonmagnetic material to cover the pair of lead layers 10 and the exposed region of free magnetic layer 4 of GMR element 5. For the same purpose, a cap layer 12 may be provided instead only on an area above the free magnetic layer 4, as shown in FIG. 1(c).

A heat treatment (annealing) is applied under a predetermined temperature and duration while providing magnetic fields in a direction of Y axis, for orientating the magnetization direction of pinning layer 2, which being a constituent of the GMR element 5, to the direction of Y axis, which direction is perpendicular to the sliding surface of a head facing a magnetic recording medium (viz. a direction that is perpendicular to the sheet of FIG. 1(a)). After undergoing the above procedure, the magnetization direction of pinning layer 2 is firmly fixed to the direction Y by the effect of exchange-coupling magnetic field with the antiferromagnetic layer 1. On the other hand, the hard magnetic layer 6, which being a constituent of the laminated longitudinal biasing layer 9, is magnetized by applying magnetic fields in the direction of track width (direction of X axis) so that the magnetization direction is along the X axis (direction X, or direction −X), which is approximately perpendicular to that of the pinning layer 2. And, magnetization direction of the free magnetic layer 4 ferromagnetically coupled with the hard magnetic layer 6 is determined. The magnetization of the hard magnetic layer 6 can be made in room temperature. The heat treatment for magnetizing the pinning layer 2 to a certain specific direction should preferably be done after the cap layer 11, or 12, has been formed.

When the thickness of the pair of the right and the left nonmagnetic layers 7, which are constituent of the laminated longitudinal biasing layer 9, is small the magnetization direction of soft magnetic layer 8 remains the same as that of the hard magnetic layer 6. Meanwhile, if layer thickness of the nonmagnetic layer 7 is too thick, the magnetization direction of the soft magnetic layer 8 becomes again the same as that of the hard magnetic layer 6. The magnetization direction of the soft magnetic layer 8 cyclically changes depending on layer thickness of the nonmagnetic layer 7, assuming the same and opposite directions relative to that of the hard magnetic layer; and strength of the magnetic field coupling both magnetic layers gradually reduces. Therefore, the thickness of nonmagnetic layer 7 needs to be determined to be falling within an appropriate range. Namely, by establishing the layer thickness of nonmagnetic layer 7 at a certain specific value, the hard magnetic layer 6 and the soft magnetic layer 8 can be antiferromagnetically exchange-coupled together so that the soft magnetic layer 8 is magnetized to a direction that is opposite to that of the hard magnetic layer 6. According to the results of studies conducted by the inventor and staff members, appropriate values of layer thickness for the nonmagnetic layer 7 to cause antiferromagnetic coupling between the soft magnetic layer 8 and the hard magnetic layer 6 are dependent on kind of the nonmagnetic materials used. The optimum values found out for each of the materials is shown in Table 1 below.

TABLE 1

| Nonmagnetic material used | Layer thickness for reversing the magnetization direction |
| --- | --- |
| Ru | 0.4–0.8 nm |
| Cu | vicinity 0.9 nm,–vicinity 2.0 nm |
| Ag, Au | 2–3 nm |
| Ir | vicinity 1.3 nm |

Figure 2A:
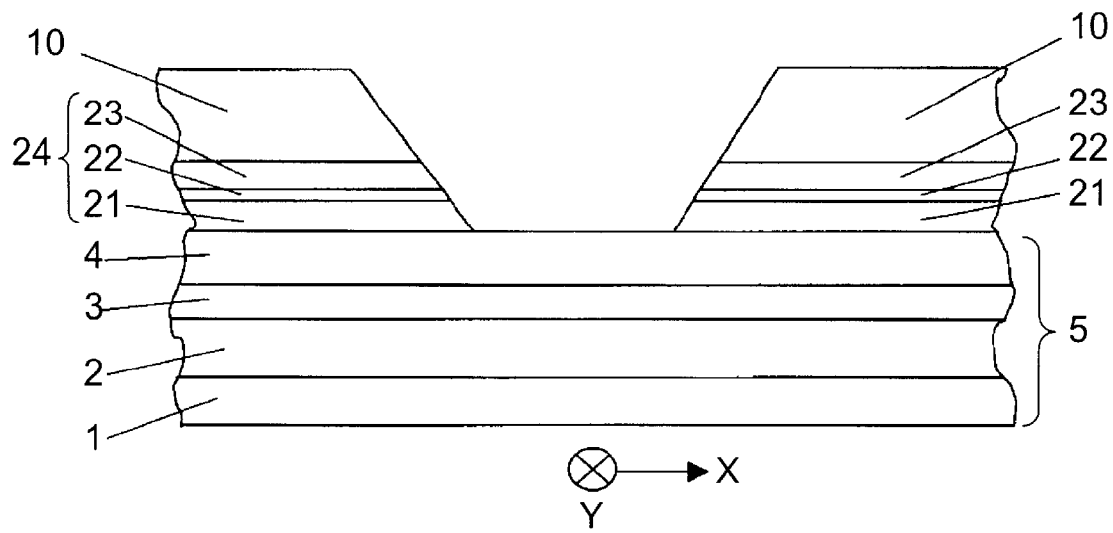
FIG. 2 Front outline view showing the structure, in the vicinity of magnetoresistive element, of a thin film head in accordance with other example of the first exemplary embodiment of the present invention.

The laminated longitudinal biasing layer 9 has been formed by stacking a hard magnetic layer, a nonmagnetic layer and a soft magnetic layer in the order. It may be formed instead by reversing order of the soft magnetic layer and the hard magnetic layer, as shown in FIG. 2(a); namely, a pair of the right and the left laminated longitudinal biasing layers 24 may be formed by depositing a soft magnetic layer 21, a nonmagnetic layer 22 and a hard magnetic layer 23 in the sequence. Also in the above configuration, the hard magnetic layer 23 is antiferromagnetically exchange-coupled with the soft magnetic layer 21 facing to the hard magnetic layer 23 via the nonmagnetic layer 22, and assumes the same magnetization direction as that of the soft magnetic layer 21; and the free magnetic layer 4 ferromagnetically coupled with the soft magnetic layer 21 is provided with stabilized magnetization direction of the soft magnetic layer 21. Also in the present case, the magnetization direction of the hard magnetic layer 23 and the soft magnetic layer 21, which layers are facing to each other via the nonmagnetic layer 22, changes depending on layer thickness of the nonmagnetic layer 22.

Figure 2B:
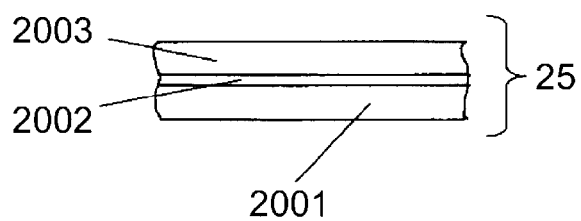

The pinning layer of the present embodiment has been formed in the single-layer structure. It may be formed instead as a laminated pinning layer 25, as shown in FIG. 2(b), consisting of a plurality of magnetic layers, viz. a first pinning layer 2001, a nonmagnetic layer 2002 and a second pinning layer 2003. Also, in this case, direction of magnetization in the first pinning layer 2001 and the second pinning layer 2003 is orientated to assume the same or opposite direction depending on thickness of the nonmagnetic layer 2002. Optimum values for the layer thickness shown in Table 1 above apply also to the nonmagnetic layer.

Figure 2C:
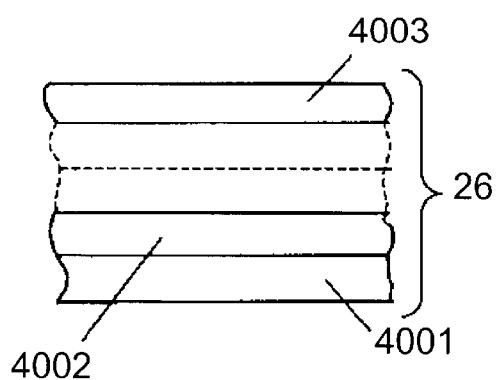

Also, the free magnetic layer may be configured in the form of a laminated free magnetic layer 26, as shown in FIG. 2(c), consisting of a plurality of magnetic layers; a first magnetic layer 4001, a second magnetic layer 4002 . . . a magnetic layer of the n-th order 4003, where the respective adjacent magnetic layers use different kinds of soft magnetic material.

As described in the above, in the present embodiment 1, a soft magnetic layer and a hard magnetic layer have been stacked together facing to each other via a nonmagnetic layer, and hard magnetic layer and soft magnetic layer are antiferromagnetically exchange-coupled firmly. By magnetizing the hard magnetic layer in direction X, respective magnetization directions of hard magnetic layer and soft magnetic layer can be orientated firmly to the direction of track width in a stable state. Therefore, magnetization direction of the free magnetic layer ferromagnetically coupled with the hard magnetic layer is also orientated to the direction of track width, and becomes quite stabilized. Magnetization direction of the free magnetic layer in a region between the pair of the right and the left laminated longitudinal biasing layers also readily assumes the same direction as that of the free magnetic layer in the regions making physical contact with the hard magnetic layers.

The laminated soft magnetic layer as shown in FIG. 2(b) exhibits exactly the same results.

In the present embodiment 1, thickness of the nonmagnetic layer disposed between the hard magnetic layer and the soft magnetic layer is set at a specific value shown in Table 1; and the hard magnetic layer and the soft magnetic layer are antiferromagnetically exchange-coupled to assume opposite magnetization directions each other. Therefore, magnetic charges emerging at the ends of both magnetic layers cancel to each other, and leakage magnetic field caused by the magnetic charge becomes small. As a result, the magnetization in both of the magnetic layers are stabilized over the entire region until the respective end portions. The magnetization direction of free magnetic layer in the regions facing to the hard magnetic layer, or soft magnetic layer, is orientated to the direction of track width in a stable state; and, no unwanted magnetic fields is given on the free magnetic layer and the pinning layer. Thus, a thin film head in accordance with the present embodiment 1 generates superior reproducing signals of good symmetry with reduced Barkhausen noise. The reproducing sensitivity is high and stabilized in the thin film head.

Next, a second exemplary embodiment of the present invention is described. FIG. 3 through FIG. 12 describe outline of the process steps for manufacturing the reproducing part of a magnetoresistive thin film head. The drawings show cross sectional views, in the vicinity of sliding surface of the head, sectioned by a plane parallel to the sliding surface. Method for manufacturing the magnetoresistive thin film head of the present invention is described in the order of process steps referring to the drawings.

Figure 3:
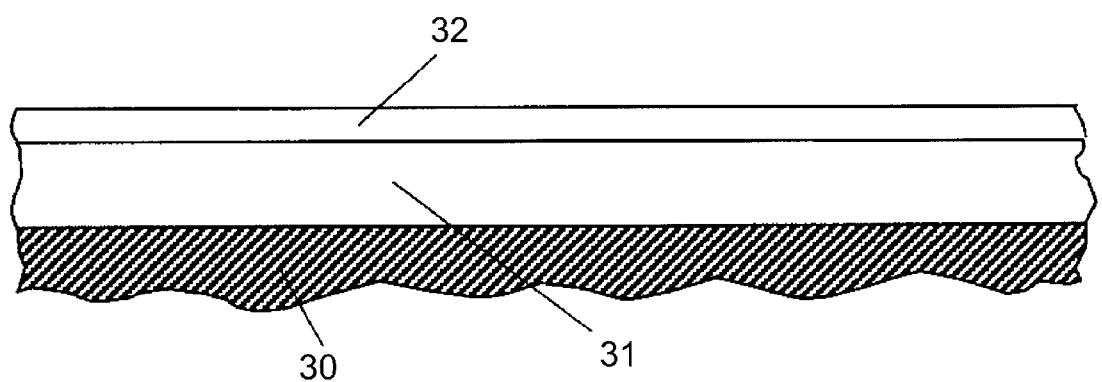
FIG. 3 Outline view used to describe part of the process for manufacturing a thin film head in accordance with a second exemplary embodiment of the present invention.

As shown in FIG. 3, on a substrate 30 of AlTiC or other nonmagnetic material, a lower magnetic shield layer 31 formed of soft magnetic material such as Permalloy, a Co amorphous magnetic layer, an Fe fine grain magnetic layer; and a lower gap layer 32 formed of nonmagnetic insulating material such as $Al_2O_3$, AlN, $SiO_2$, are deposited sequentially.

Figure 4A:
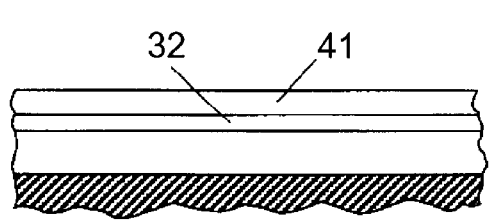
FIG. 4 Outline view used to describe a first process step for manufacturing a thin film head in accordance with the second exemplary embodiment of the present invention.
Figure 4B:
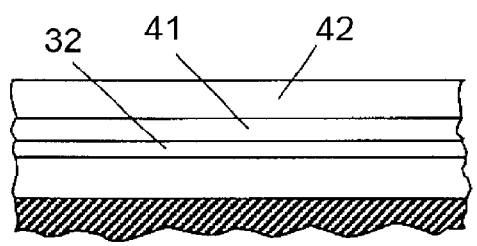
Figure 4C:
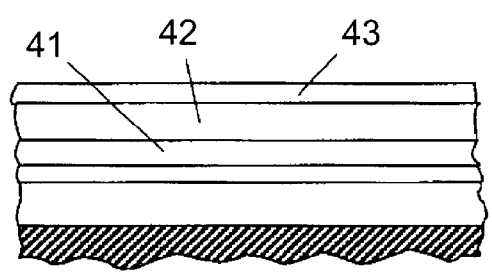
Figure 4D:
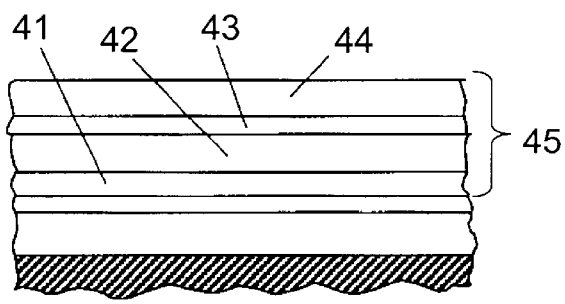

As the first process step, an antiferromagnetic layer 41 is formed on the lower gap layer 32 using magnetic material such as IrMn, an FeMn alloy, a NiMn alloy, a PtMn alloy, $\alpha Fe_2O_3$, NiO, as shown in FIG. 4(a). Then, as shown in FIG. 4(b), a pinning layer 42 is formed using magnetic material such as a NiFe alloy, a Co or CoFe alloy, etc. And then, as shown in FIG. 4(c), a nonmagnetic conductive layer 43 is formed on the pinning layer 42 using Cu or other nonmagnetic material. Further, as shown in FIG. 4(d), a free magnetic layer 44 is formed on the nonmagnetic conductive layer 43 using the same magnetic material as the pinning layer 42. The above-described process steps complete a GMR element 45.

Figure 5A:
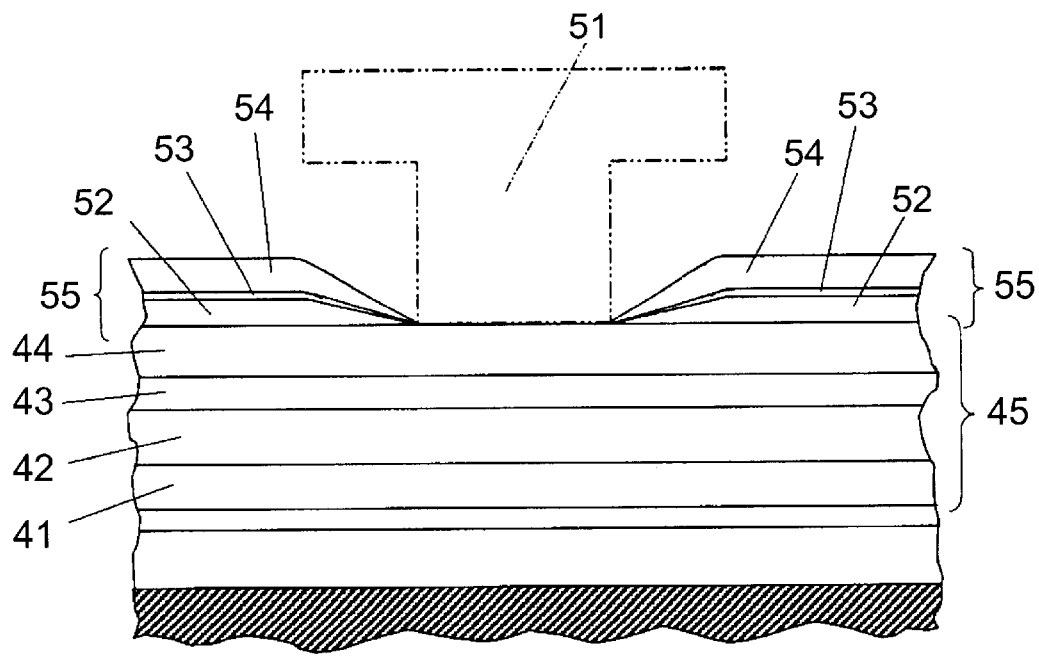
FIG. 5 Outline view used to describe a second and a third process steps for manufacturing a thin film head in accordance with the second exemplary embodiment of the present invention.

The second step is described using FIG. 5(a). In the first place, a mushroom-shape resist 51 is provided on the free magnetic layer 44. Then, using the resist 51 as mask, a pair of the right and the left laminated longitudinal biasing layers 55 are formed by sequentially depositing on the free magnetic layer 44 a hard magnetic layer 52 of a PtMn alloy layer or other magnetic material, a nonmagnetic layers 53 of Ru or other nonmagnetic material and a soft magnetic layer 54 using the same magnetic material as the free magnetic layer 44.

Figure 5B:
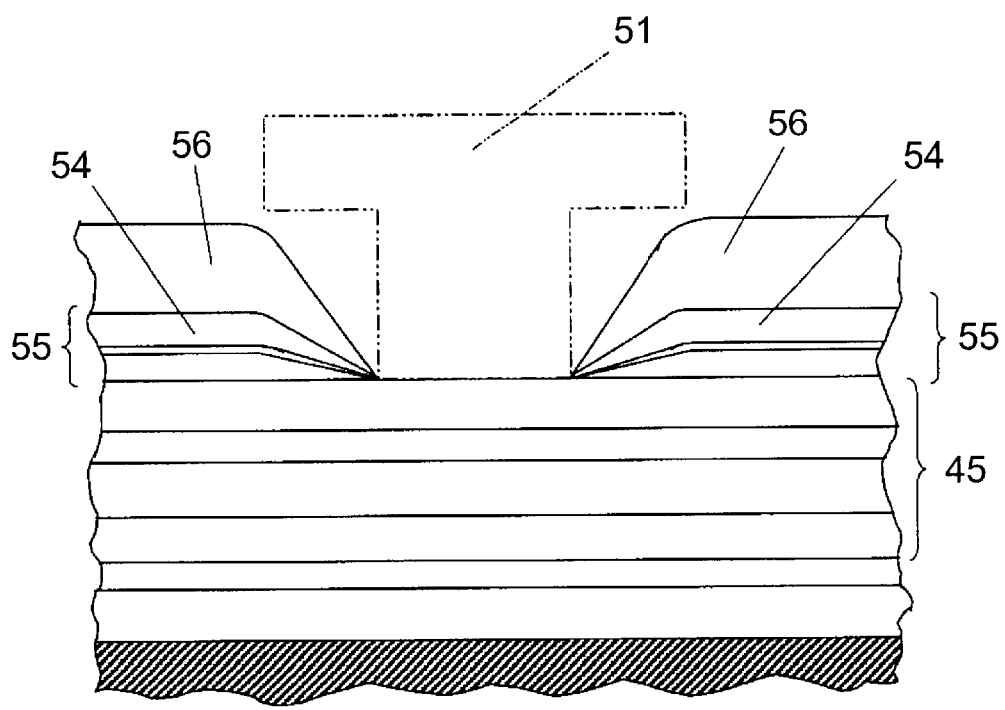
Figure 6A:
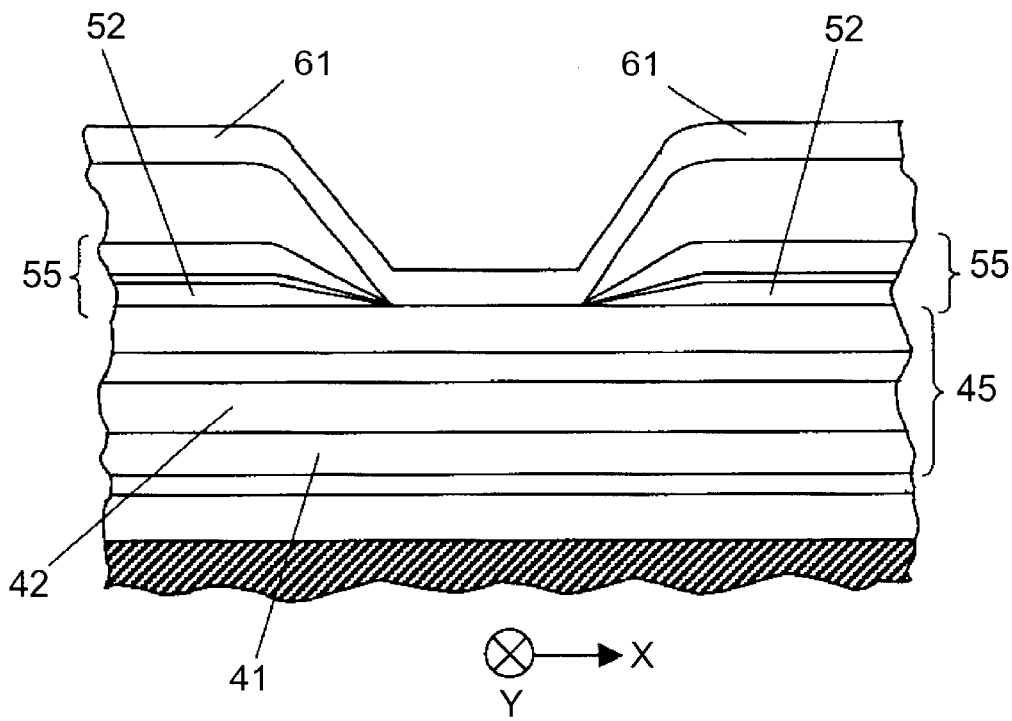
FIG. 6 Outline view used to describe part of other process step for manufacturing a thin film head in accordance with the second exemplary embodiment of the present invention.

The third process step is shown in FIG. 5(b). A pair of the right and the left lead layers 56 are formed on the laminated longitudinal biasing layer 55 using Cu, Cr, Ta or other nonmagnetic material, with the resist layer 51 used as mask. Then, as shown in FIG. 6(a), the mushroom-shape resist 51 is removed, and an upper gap layer 61 is formed using the same insulating material as the lower gap layer 32. And then, as shown in FIG. 6(b), an upper magnetic shield layer 62 is provided on the upper gap layer 61 using the same soft magnetic material as the lower magnetic shield layer 31 to complete the reproducing part 63 of a magnetoresistive thin film head.

Figure 7A:
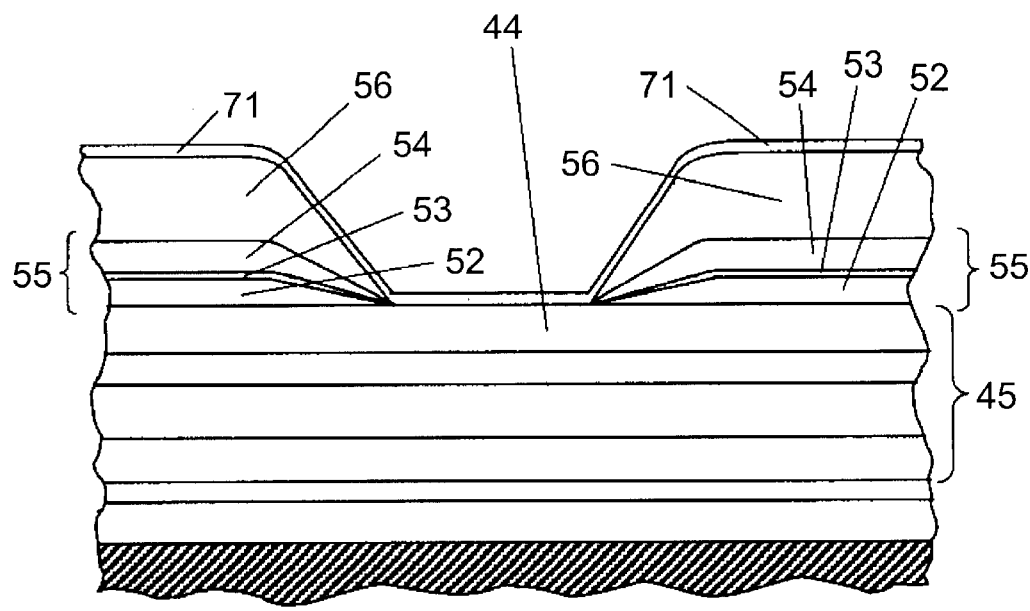
FIG. 7 Outline view used to describe a fourth process step in the second exemplary embodiment of the present invention.
Figure 7B:
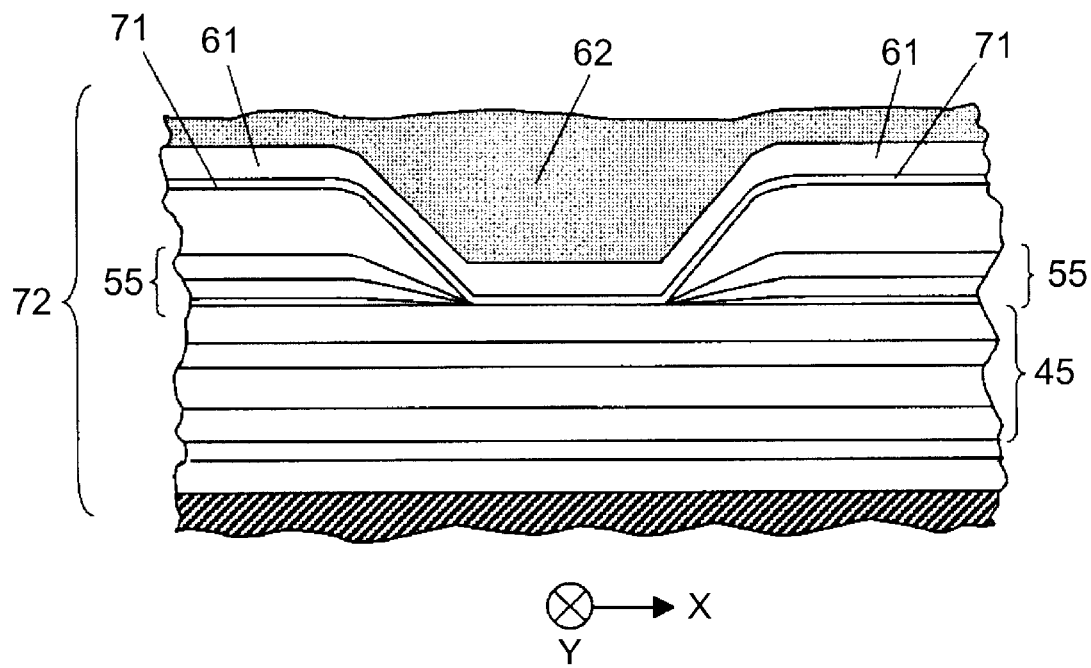

The fourth process step is shown in FIG. 7(a). In order to prevent the free magnetic layer 44 exposed at the top stratum of the GMR element 45, from corrosion, it is preferred to add a process step of forming a cap layer 71 using Ta or other such material. FIG. 7(b) shows the reproducing part 72 of a thin film head after the fourth process step has been additionally introduced.

Figure 6B:
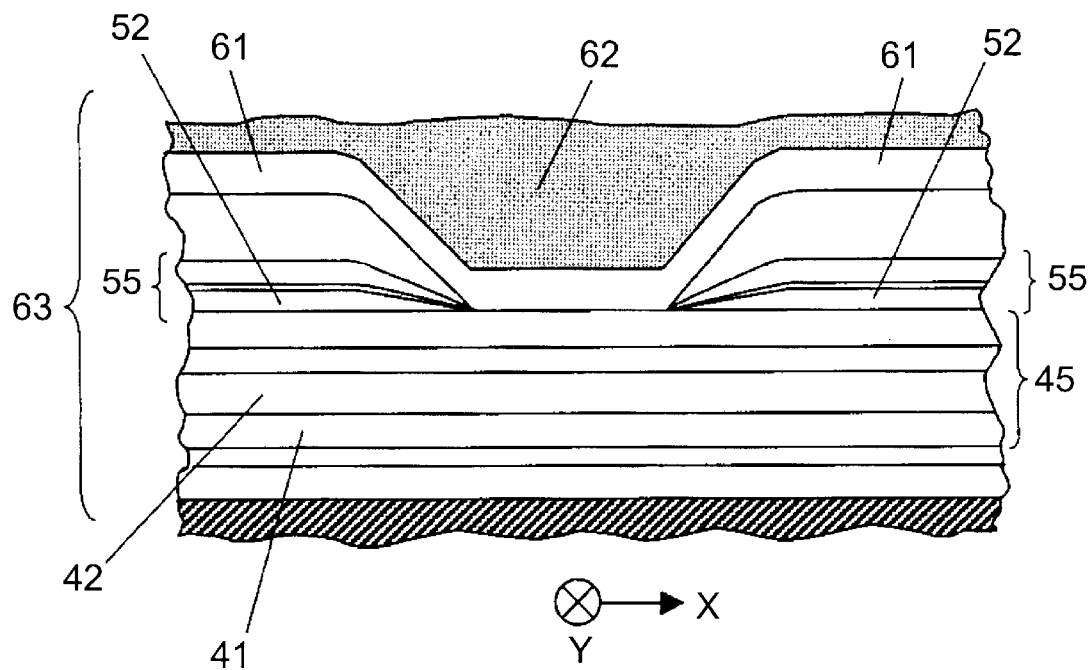

Next, annealing (heat treatment) is conducted at a predetermined temperature and duration, while applying magnetic fields in the direction of Y axis (direction that is perpendicular to the sheet of FIG. 6(a), or FIG. 6(b)), or a direction perpendicular to the sliding surface of the head, for orientating the magnetization direction of antiferromagnetic layer 41 to the Y direction; and fixing magnetizing direction of the pinning layer 42, locating next to the antiferromagnetic layer 41, in the direction of Y axis by the effect of exchange-coupling magnetic fields. The hard magnetic layer 52 is magnetized by applying magnetic fields in the direction of track width (direction of X axis) in room temperature, for establishing magnetization direction of the free magnetic layer 44, which is ferromagnetically coupled with the hard magnetic layer 52, in the same direction as that of the hard magnetic layer 52. The heat treatment (annealing) for establishing the direction of magnetization should preferably be conducted at the stage after the cap layer has been formed in the fourth process step, before the cap layer, the lead layer and the laminated layer are patterned to a certain predetermined shape.

In the second process step after the mushroom-shape resist 51 has been provided on the free magnetic layer 44 of GMR element 45, as shown in FIG. 5(a), upper surface of the free magnetic layer 44 may be cleaned by means of Ar presputtering, ECR, or other method for removing oxides, residual resists, foreign substance, stains, etc. sticking on the surface of free magnetic layer 44. Said pair of the right and the left laminated longitudinal biasing layers 55 may be deposited after finishing the surface cleaning. The cleaning of the upper surface of the free magnetic layer 44 contributes to maintain strong magnetic fields ferromagnetically coupling the free magnetic layer and the hard magnetic layer; where, foreign substances between the free magnetic layer and the hard magnetic layer have been eliminated.

Figure 8A:
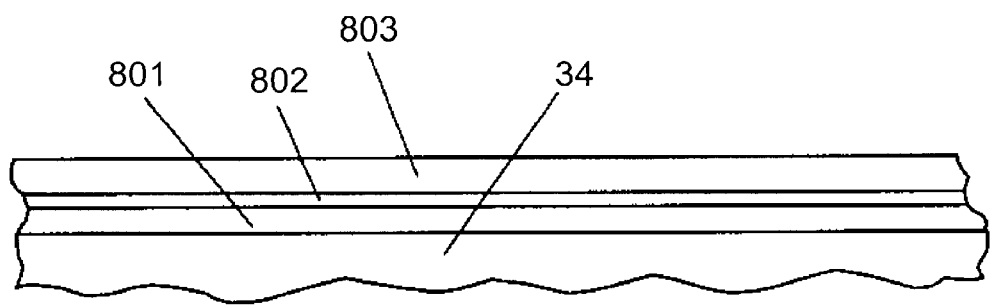
FIG. 8 Outline view used to describe other example of the second process step in the second exemplary embodiment of the present invention.
Figure 8B:
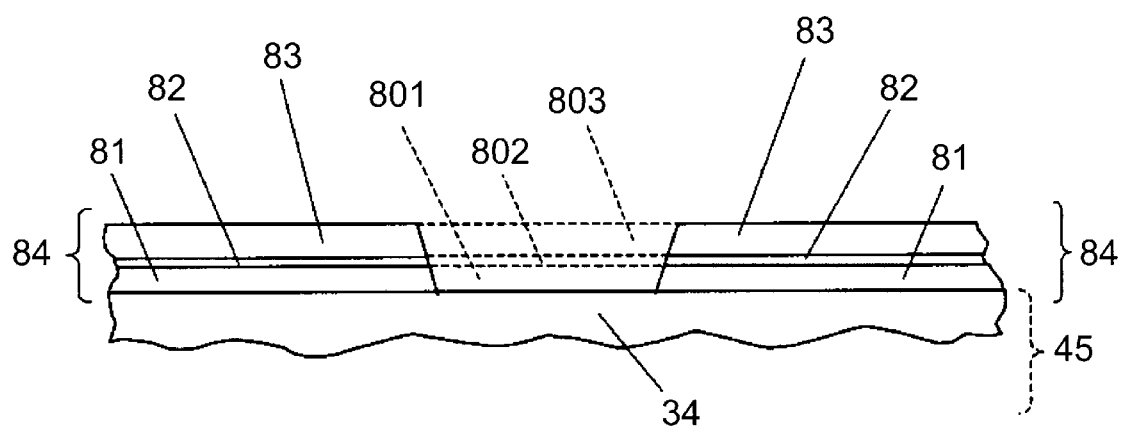

Other method for providing the pair of the right and the left laminated longitudinal biasing layers 84 is described below. As shown in FIG. 8(a), on the free magnetic layer 34 of GMR element, a hard magnetic layer 801 formed of a CoPt alloy or other hard magnetic material, a nonmagnetic layer 802 formed of Ru or other nonmagnetic material and a soft magnetic layer 803 formed of the same magnetic material as the free magnetic layer are sequentially deposited. And then, as shown in FIG. 8(b), the stacked hard magnetic layer 801, nonmagnetic layer 802 and soft magnetic layer 803 are etched off in part by dry etching or other method until the upper surface of the free magnetic layer 44 is exposed. Also in the present case, it is preferred to clean the upper surface of free magnetic layer 44 by Ar presputtering, ECR or other method to remove oxides, foreign materials, stains sticking on the surface of free magnetic layer 44, before depositing sequentially the hard magnetic layer 801, the nonmagnetic layer 802 and the soft magnetic layer 803 thereon.

Figure 9:
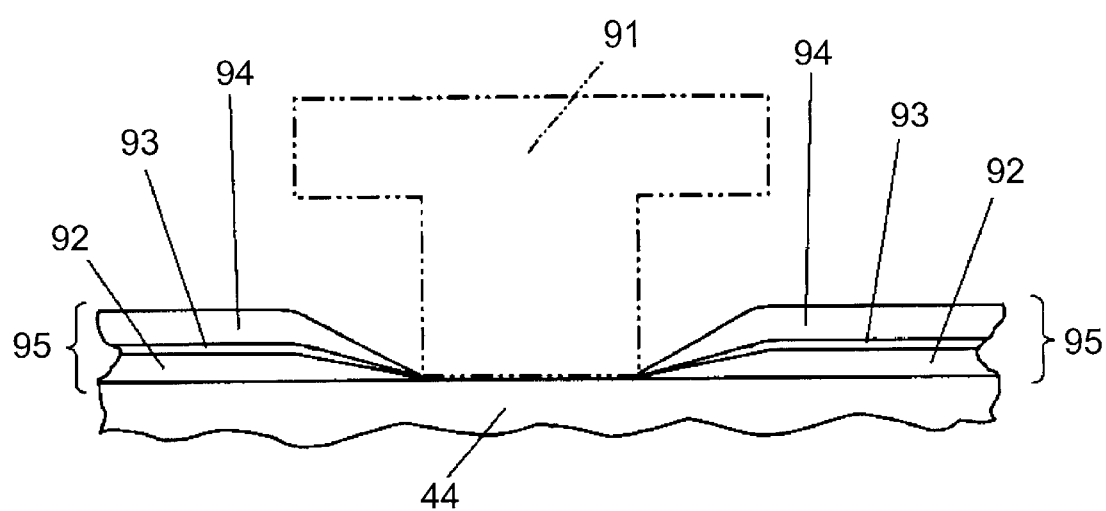
FIG. 9 Outline view used to describe other example of the second process step in the second exemplary embodiment of the present invention.

A pair of the right and the left laminated longitudinal biasing layers 95 may be provided instead through a procedure as shown in FIG. 9, where: a soft magnetic layer 92, a nonmagnetic layer 93 and a hard magnetic layer 94 are sequentially deposited on the free magnetic layer 44 using a mushroom-shape resist 91 as mask. Also in the present case, it is preferred to clean the upper surface of the free magnetic layer 44 disposed at the uppermost stratum of GMR element 45 by Ar presputtering, ECR or other method, after the mushroom-shape resist 91 has been formed.

Figure 10A:
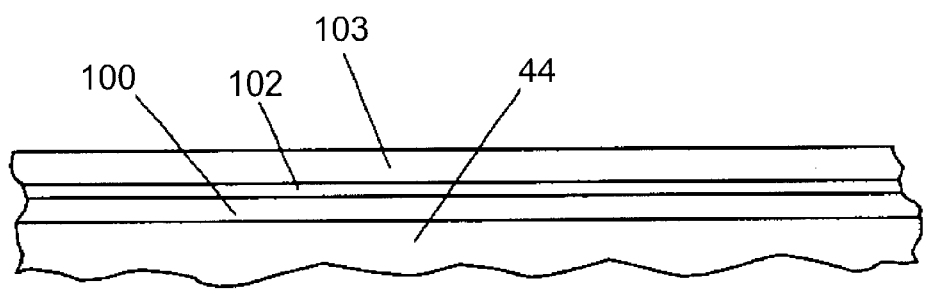
FIG. 10 Outline view used to describe other example of the second process step in the second exemplary embodiment of the present invention.
Figure 10B:
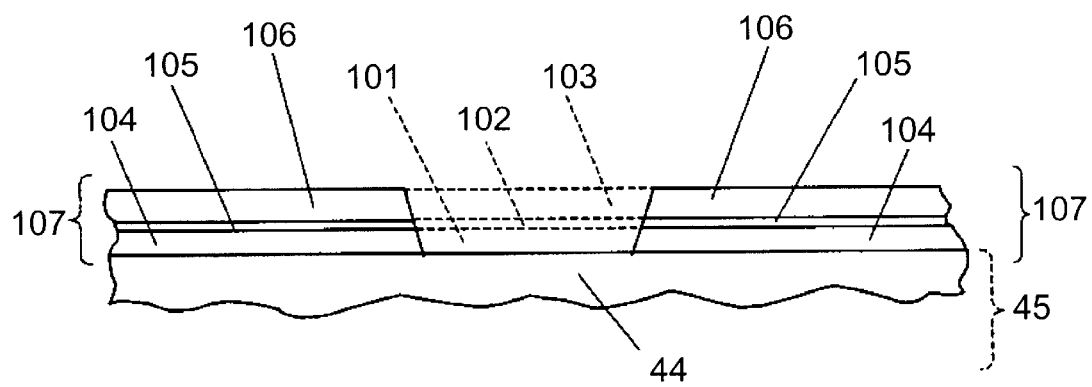

In the second process step, the stacking sequence of the hard magnetic layer and the soft magnetic layer may be reversed among the layers of the laminated longitudinal biasing layer. As shown in FIG. 10(a), for example, a soft magnetic layer 101, a nonmagnetic layer 102 and a hard magnetic layer 103 are stacked in the order on the free magnetic layer 44. And then, as shown in FIG. 10(b), the soft magnetic layer 101, the nonmagnetic layer 102 and the hard magnetic layer 103 are removed in part by dry etching or other method to form a pair of the right and the left laminated longitudinal biasing layers 107, each of the layers containing a soft magnetic layer 104, a nonmagnetic layer 105 and a hard magnetic layer 106. Before depositing the above-described layers, it is preferred to clean the upper surface of the free magnetic layer 44 by the same method as described earlier to remove oxides, foreign materials, stains sticking on the surface of free magnetic layer 44. This contributes to maintain strong magnetic fields ferromagnetically coupling the soft magnetic layer and the free magnetic layer.

Figure 11A:
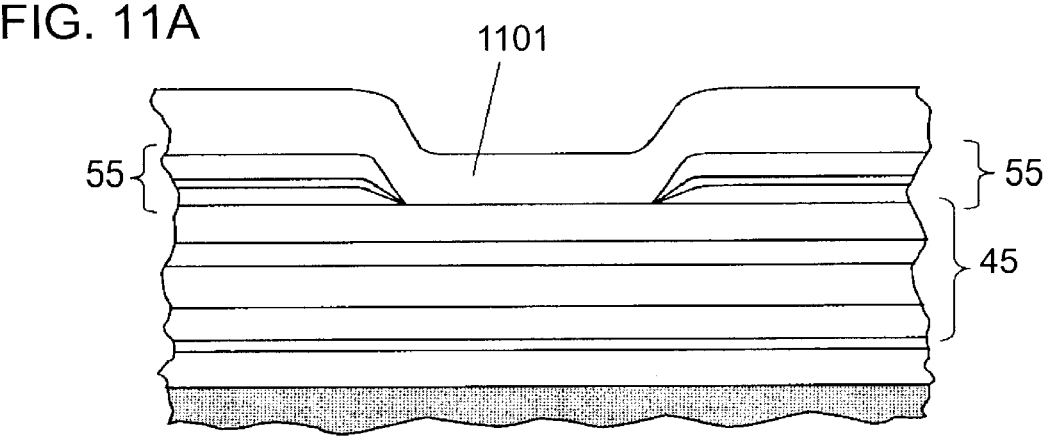
FIG. 11 Outline view used to describe other example of the third process step in the second exemplary embodiment of the present invention.
Figure 11B:
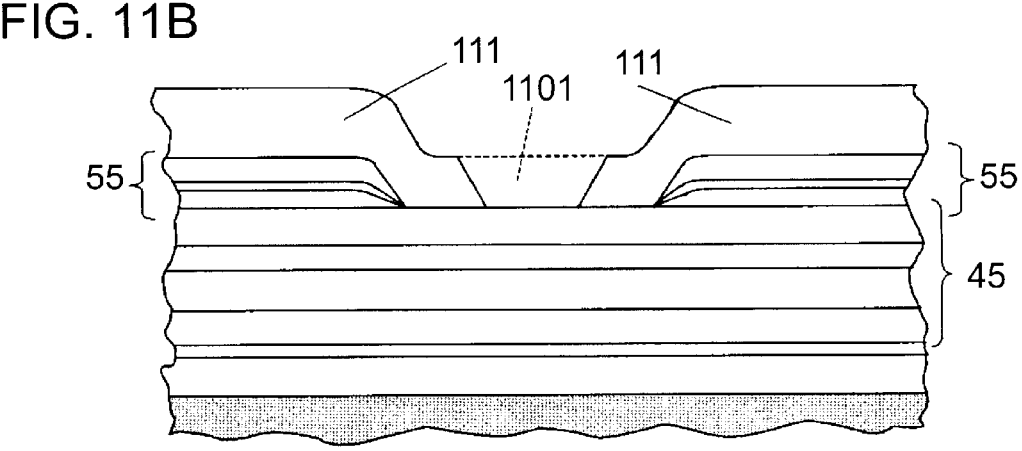
Figure 11C:
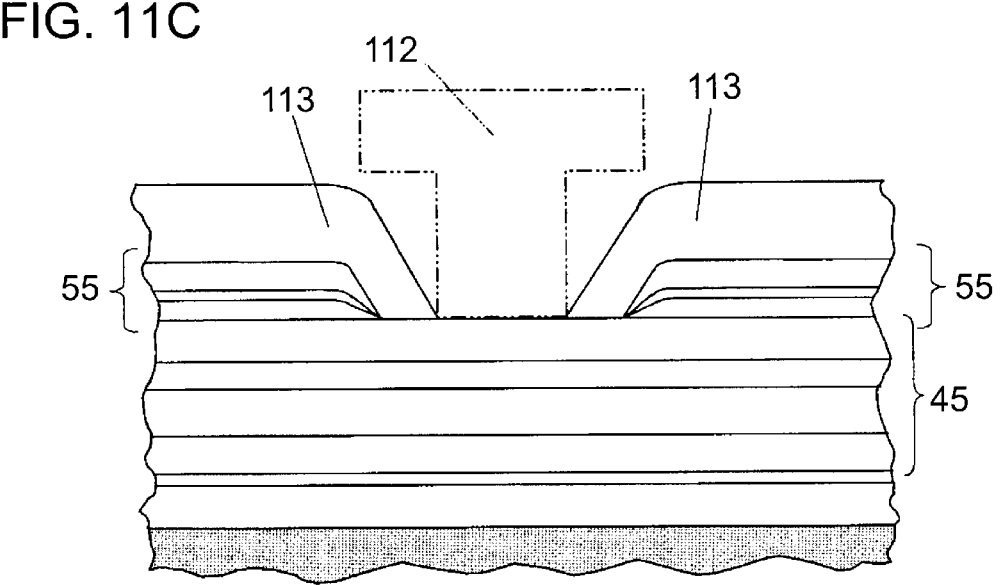

Alternative methods of forming the lead layer include: After the laminated longitudinal biasing layers 55 have been formed by the procedure as illustrated in FIG. 5(a), the mushroom-shape resist 51 is removed, and then a lead layer 1101 is provided covering the laminated longitudinal biasing layers 55 and the exposed region of the GMR element 45, as shown in FIG. 11(a). Part of the lead layer 1101 is removed by etching or other method, as shown in FIG. 11(b), to form a pair of the right and the left lead layers 111.

Instead, a pair of the right and the left lead layers 113 may be formed through the following procedure. After the laminated longitudinal biasing layers 55 have been formed; the mushroom-shape resist 51 is removed, and then other mushroom-shape resist mask 112 having a stem (the portion making contact with the free magnetic layer) smaller than that of the mushroom-shape resist 51 is provided for depositing the pair of the right and the left lead layers 113.

Figure 12A:
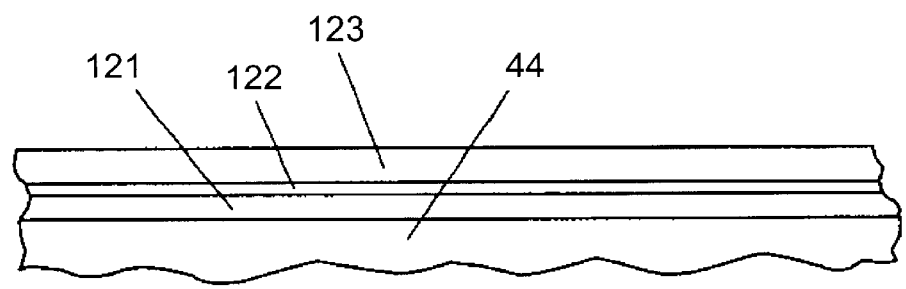
FIG. 12 Outline view used to describe other example of the second and the third process steps in the second exemplary embodiment of the present invention.
Figure 12B:
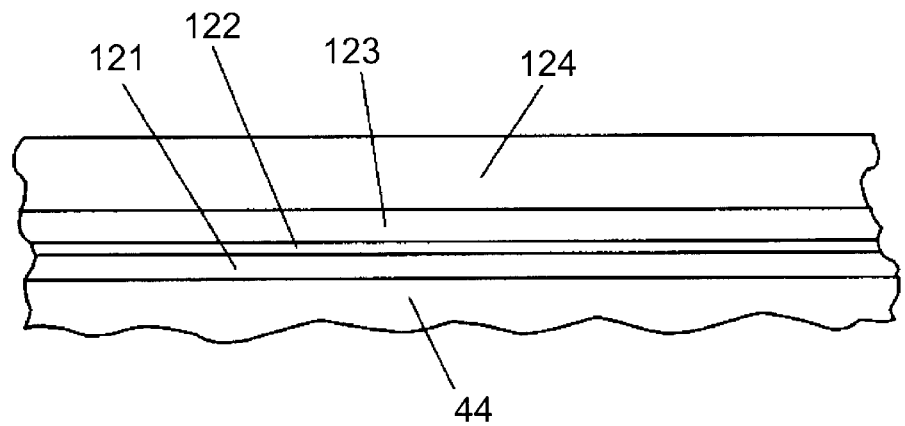
Figure 12C:
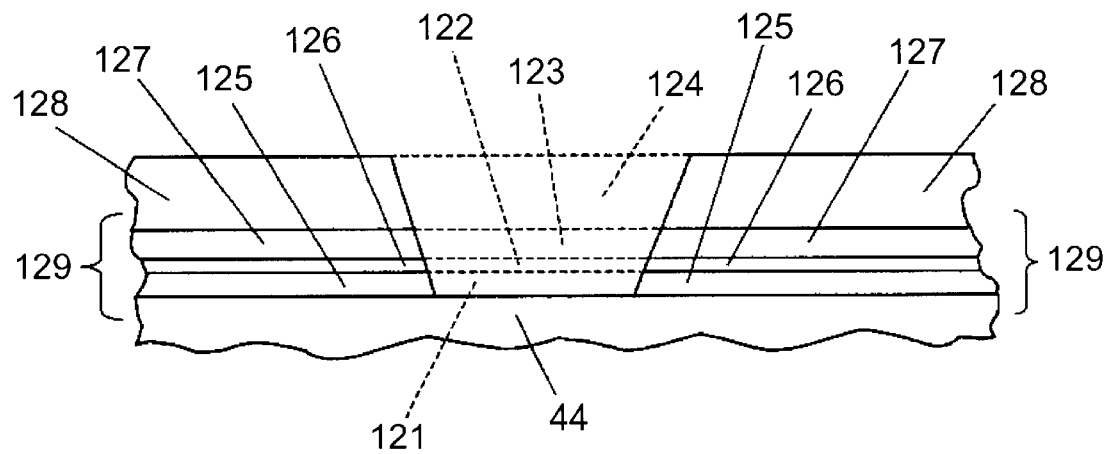

The laminated longitudinal biasing layers and the lead layers may also be manufactured through other procedure, where; as shown in FIG. 12(a), a hard magnetic layer 121, a nonmagnetic layer 122 and a soft magnetic layer 123 are sequentially deposited on the free magnetic layer 44 of GMR element, and then on top of it, a lead layer 124 is formed, as shown in FIG. 12(b). Next, as shown in FIG. 12(c), each of the above-described layers is removed in part by dry etching or other method to provide a pair of the right and the left laminated longitudinal biasing layers 129, each containing a hard magnetic layer 125, a nonmagnetic layer 126 and a soft magnetic layer 127, as well as a pair of the right and the left lead layers 128. Sequence of depositing the hard magnetic layer 121 and the soft magnetic layer 123 may be reversed also in the present case. The pinning layer of GMR element can be a laminated pinning layer formed of a plurality of magnetic layers with nonmagnetic layer interposed, as shown in FIG. 2(b). The free magnetic layer of GMR element can also be a laminated free magnetic layer formed of a plurality of layers, where respective adjacent layers are formed of different kind of soft magnetic material, as shown in FIG. 2(b).

Layer thickness of the nonmagnetic layer in the laminated longitudinal biasing layer should preferably take the values as exhibited in Table of embodiment 1, so that the hard magnetic layer and the soft magnetic layer are antiferromagnetically exchange-coupled firmly. The same applies in determining the layer thickness of the nonmagnetic layer also in a case where the pinning layer of GMR element is a laminated pinning layer.

In the present embodiment 2, where the laminated longitudinal biasing layer is formed of a hard magnetic layer and a soft magnetic layer stacked thereon via a nonmagnetic layer, when the hard magnetic layer is magnetized so that it is provided with a magnetization direction, for example, in the direction of X axis, the hard magnetic layer and the soft magnetic layer are antiferromagnetically exchange-coupled together bringing about quite a stable magnetization direction in the hard magnetic layer. The free magnetic layer of GMR element making physical contact with the hard magnetic layer is ferromagnetically coupled with the hard magnetic layer, and the magnetization direction is orientated in a stable manner to the direction of X axis. Furthermore, the magnetization direction of free magnetic layer in a region free from physical contact with the hard magnetic layer readily assumes the same direction as that of the region making physical contact with the hard magnetic layer. By selecting an optimum value for the layer thickness of the nonmagnetic layer locating between the hard magnetic layer and the soft magnetic layer of the laminated longitudinal biasing layer, the soft magnetic layer is antiferromagnetically coupled with the hard magnetic layer. As a result, the respective magnetization directions become opposite to each other, the magnetic charges emerging at the ends of respective layers cancel to each other, unwanted leakage magnetic field is suppressed, and the adjacent free magnetic layer is magnetized also in a stable manner to the direction of X axis. Thus, a thin film head of the present embodiment 2 generates superior reproducing signals of good symmetry at a high reproducing sensitivity with least Barkhausen noise.

Now in the following, other method for manufacturing a magnetoresistive thin film head of the present invention is described. FIG. 13 through FIG. 15 are cross sectional outline views used to describe a method for manufacturing a magnetoresistive thin film head in accordance with a third exemplary embodiment of the present invention. The thin film head is shown in the vicinity of the sliding surface sectioned by a plane parallel to the sliding surface. Each of the process steps for manufacturing the thin film head is described with reference to the drawings.

Figure 13A:
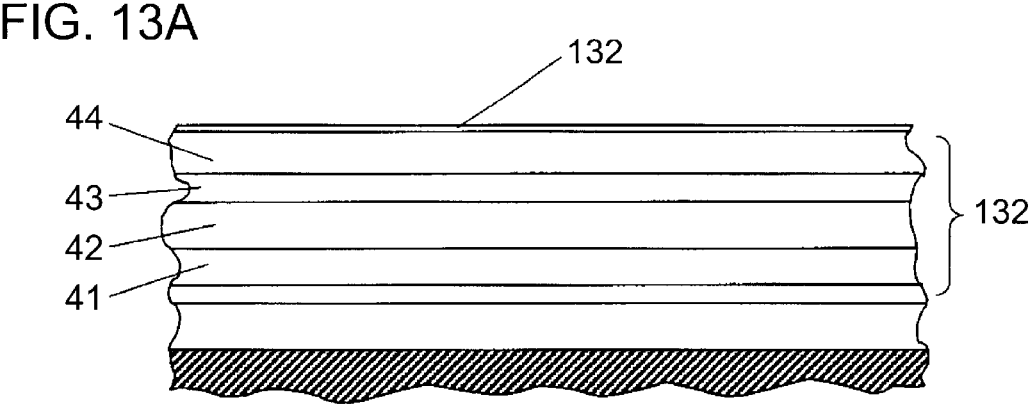
FIG. 13 Outline view used to describe first through third process steps in a third exemplary embodiment of the present invention.

In the first process step, as shown in FIG. 13(a), an antiferromagnetic layer 41, a pinning layer 42, a nonmagnetic conductive layer 43 and a free magnetic layer 44 are sequentially deposited to form a GMR element 131. On top of the free magnetic layer 44 of GMR element, a cap layer 132 is formed using Ta or the like material, for the purpose of anticorrosion.

Figure 13B:
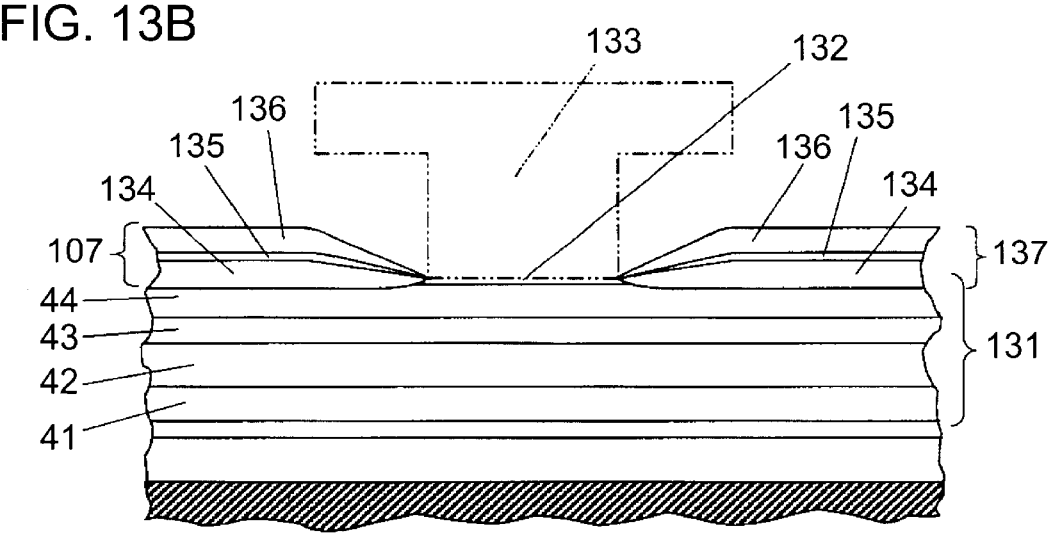

The second process step is described referring to FIG. 13(b). A mushroom-shape resist 133 is provided for use as mask. The cap layer 132 is removed so that the free magnetic layer 44 forming the uppermost stratum of GMR element 131 is exposed. On the top of it, a hard magnetic layer 134, a nonmagnetic layer 135 and a soft magnetic layer 136 are deposited sequentially to form a pair of the right and the left laminated longitudinal biasing layers 137.

Figure 13C:
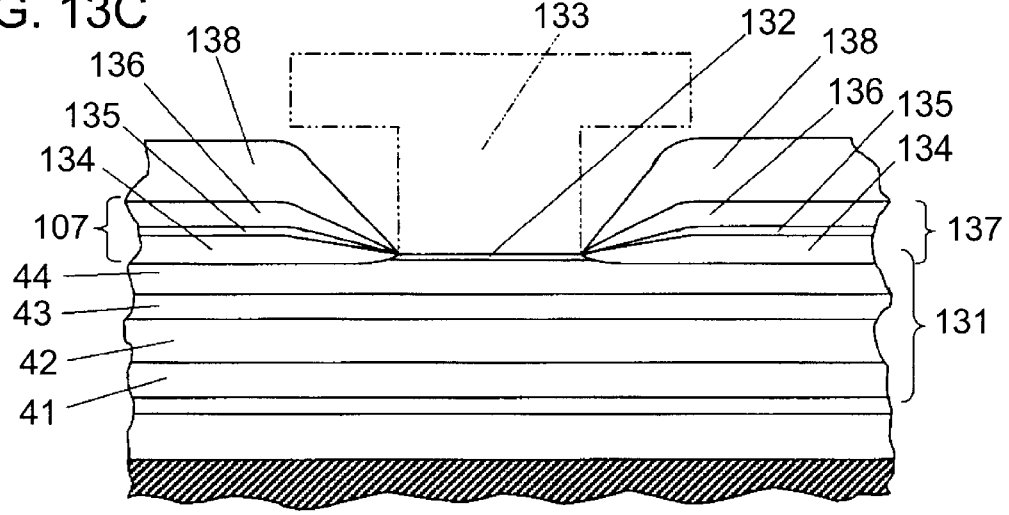

In the third process step, a pair of the right and the left lead layers 138 are formed on the pair of the right and the left laminated longitudinal biasing layers 137, as shown in FIG. 13(c). Subsequent procedures remain the same as those of embodiment 2.

Figure 14A:
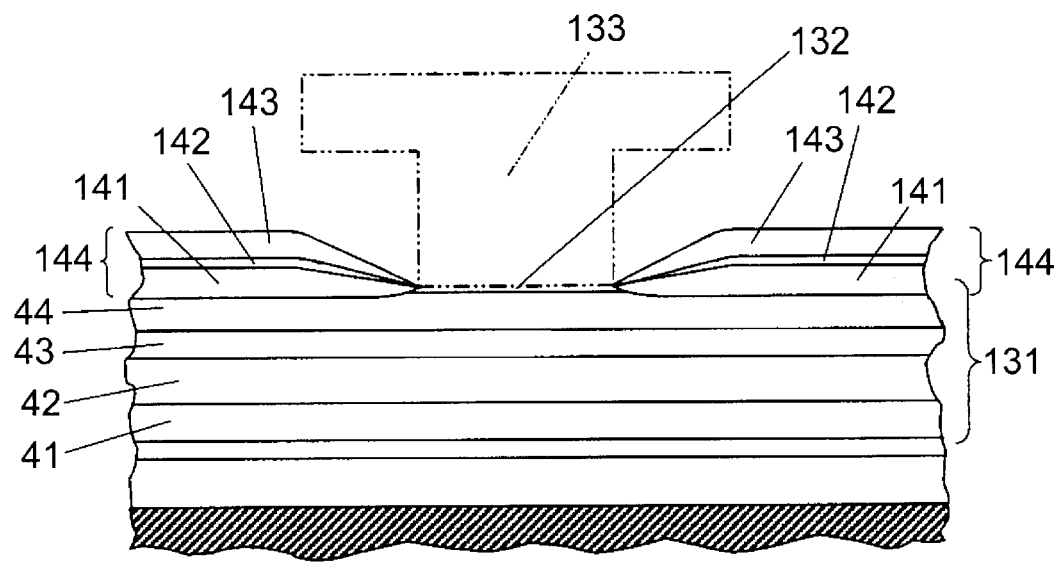
FIG. 14 Outline view used to describe other example of the second process step in the third exemplary embodiment of the present invention.
Figure 14B:
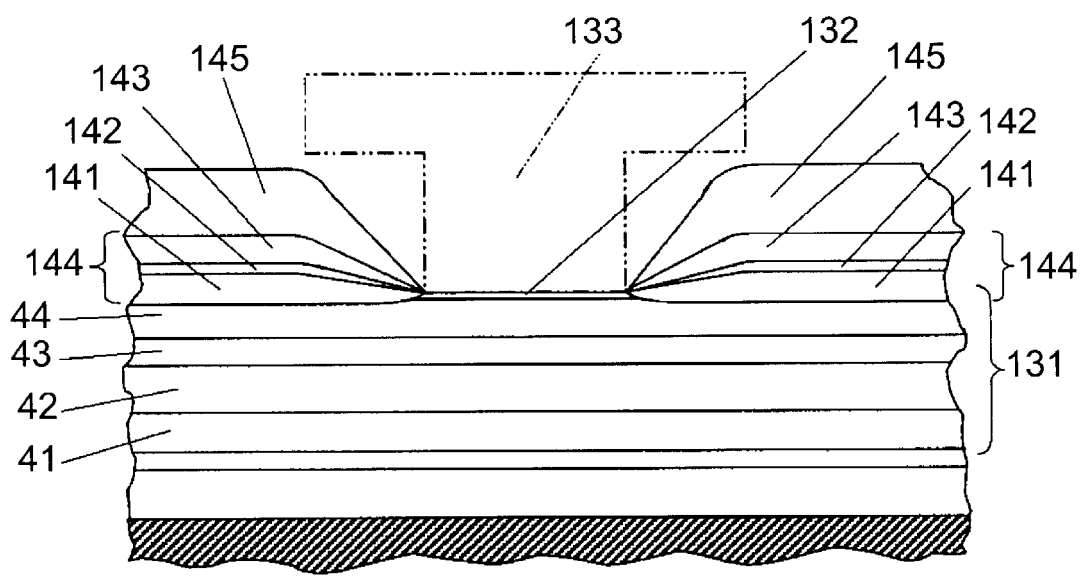

In the second process step, sequence of stacking the hard magnetic layer and the soft magnetic layer may be reversed among the laminated layers forming the longitudinal biasing layer to a configuration as shown in FIG. 14(a). Where, a soft magnetic layer 141, a nonmagnetic layer 142 and a hard magnetic layer 143 are deposited sequentially to form a pair of the right and the left laminated longitudinal biasing layers 144. On top of them, a pair of the right and the left lead layers 145 are formed as shown in FIG. 14(b).

Also in the present case, a cleaning process may be added for cleaning the surface of the free magnetic layer 44 by means of Ar presputtering, ECR or other method. After the cleaning process is finished, a hard magnetic layer 134, a nonmagnetic layer 135 and a soft magnetic layer 136 are sequentially deposited thereon to form a pair of the right and the left laminated longitudinal biasing layers 137. The laminated longitudinal biasing layers may of course be formed with a reversed sequence of depositing the hard magnetic layer and the soft magnetic layer.

Figure 15A:
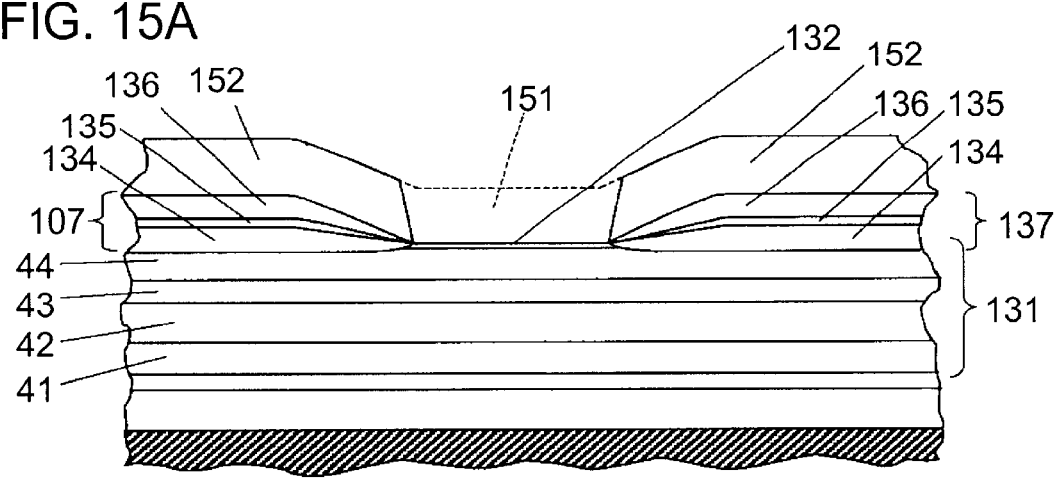
FIG. 15 Outline view used to describe other example of the third process step in the third exemplary embodiment of the present invention.
Figure 15B:
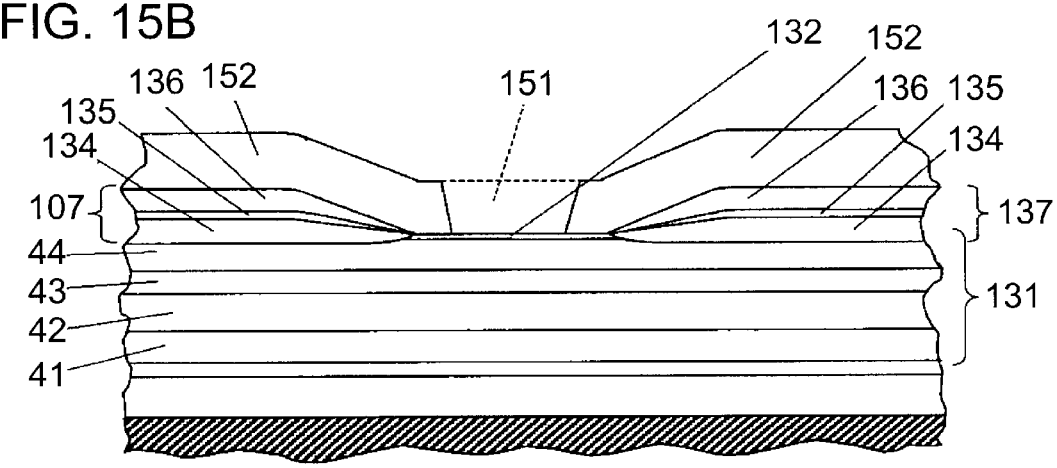
Figure 15C:
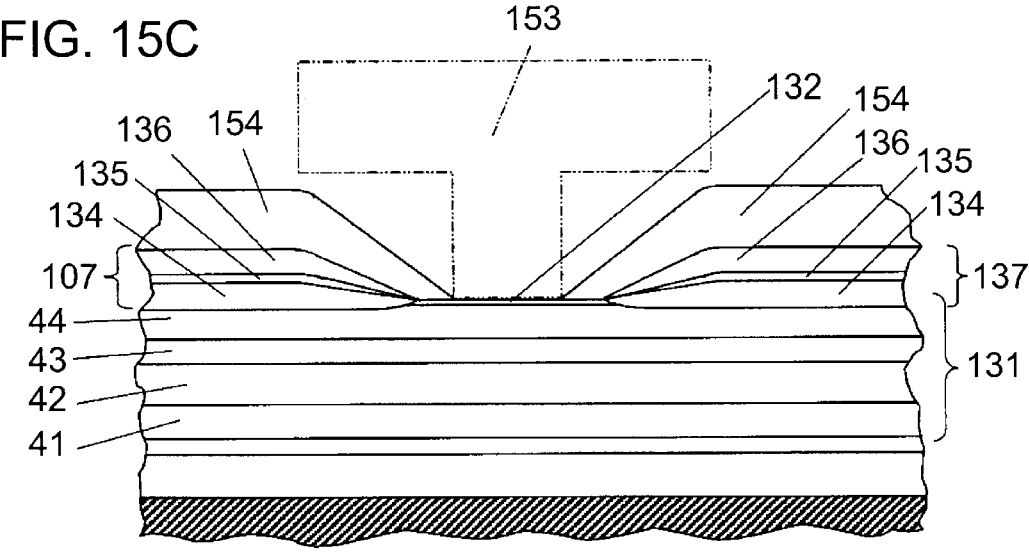
Figure 16:
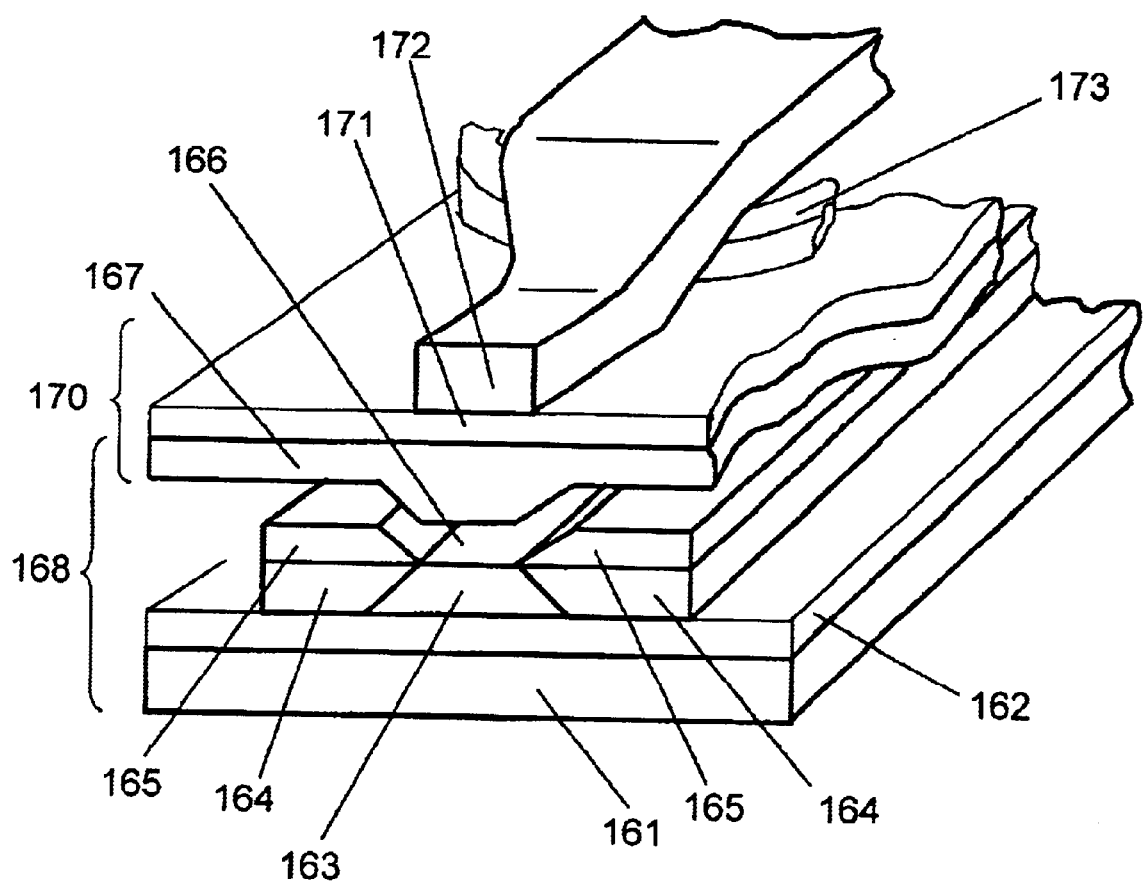
FIG. 16 Perspective view showing outline of a conventional thin film head.
Figure 17:
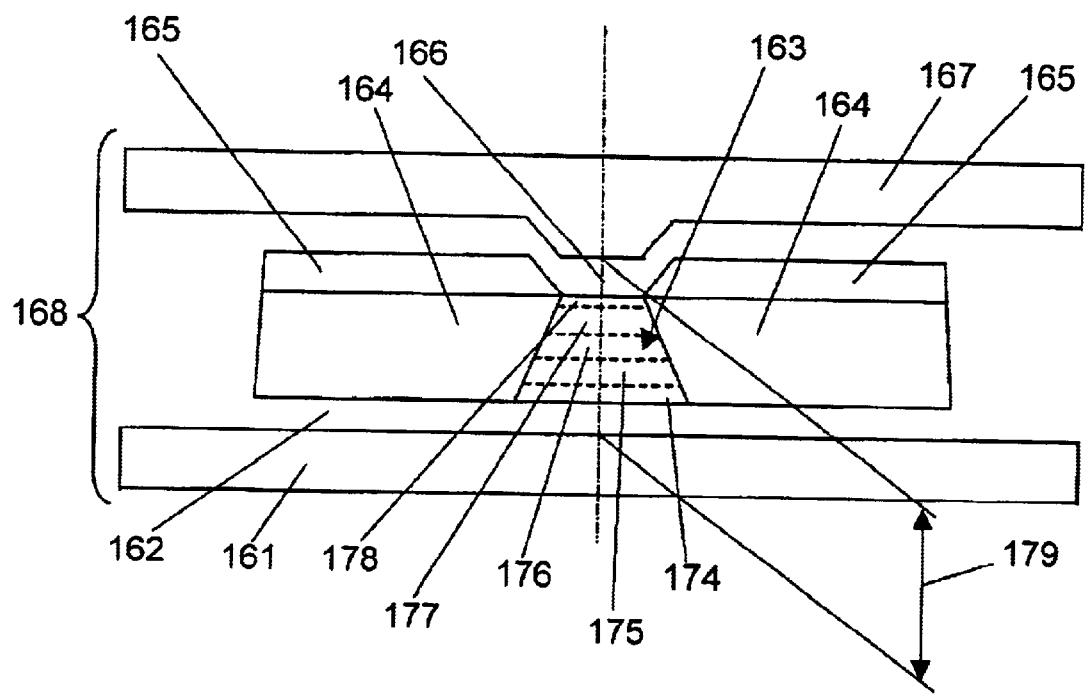
FIG. 17 Front outline view showing the structure of a conventional thin film head.

In the third process step, a pair of the right and the left lead layers 152 may be provided instead by first forming a lead layer 151 covering the pair of the right and the left laminated longitudinal biasing layers 137 and the cap layer 132, as shown in FIG. 15(a), or FIG. 15(b), and then removing the lead layer 151 in part by dry etching or other method.

Further alternative in the third process step; after the resist 133 provided for forming the pair of the right and the left laminated longitudinal biasing layers 137, shown in FIG. 13(b), has been removed, other mushroom-shape resist 153 having a stem smaller than that of the resist 133 is provided for forming a pair of the right and the left lead layers 154 on the laminated longitudinal biasing layers 137 and part of the cap layer 132.

Further in the first process step, the GMR element may be provided in the form of either a GMR element having a laminated pinning layer or a GMR element having a laminated free magnetic layer, or a GMR element containing of both of the laminated layers.

A nonmagnetic layer in the laminated longitudinal biasing layer and a nonmagnetic layer in the laminated pinning layer should preferably be formed, respectively, to the layer thickness as specified in Table 1.

As described in the above, a cap layer in the present embodiment 3 is formed continuously over the free magnetic layer of GMR element. It proves to be quite effective in protecting the free magnetic layer from oxidation or corrosion.

Thus, in the present embodiment 3, the magnetization direction of the free magnetic layer, which layer being a constituent of the GMR element, is established in a stable state, like in embodiment 2. A magnetoresistive thin film head manufactured in accordance with the present embodiment provides superior reproducing signals of good symmetry at a high reproducing sensitivity with least Barkhausen noise.

Thus in a thin film head of the present invention, a laminated longitudinal biasing layer consisting of three layers, a hard magnetic layer, a nonmagnetic layer and a soft magnetic layer, is formed on a free magnetic layer of GMR element; and the soft magnetic layer disposed to face the hard magnetic layer via the nonmagnetic layer is antiferromagnetically exchange-coupled with the hard magnetic layer, which has been magnetized in the direction of X axis. As a result, the hard magnetic layer and the soft magnetic layer are provided with quite a stable magnetization direction in the direction of X axis, and the free magnetic layer locating next to the hard magnetic layer is ferromagnetically coupled with the hard magnetic layer to be given with a stable longitudinal bias. Magnetic charges emerging at the ends of both the hard magnetic layer and the soft magnetic layer, which layers have been antiferromagnetically exchange-coupled together, cancel to each other and unwanted leakage magnetic field is suppressed; the free magnetic layer and the pinning layer are kept to be free from the unwanted magnetic field. Thus a thin film head of the present invention provides superior reproducing signals of good symmetry with least noise, and a reproduction characteristic of high sensitivity. This reveals significant advantages when applied to a thin film head, among others, whose gap length is narrow in the reproducing part for reproducing signals recorded at high density. The present invention also makes it easy to manufacture such thin film heads of superior reproducing characteristic.

What is claimed is:

1. A magnetoresistive thin film head including a magnetoresistive element between a lower magnetic shield layer and an upper magnetic shield layer with an insulating material interposed, a pair of right and left laminated longitudinal biasing layers making direct contact with said magnetoresistive element and a pair of right and left lead layers for supplying a signal current; said magnetoresistive thin film head comprising:

said magnetoresistive element including an antiferromagnetic layer, a pinning layer, a nonmagnetic conductive layer and a free magnetic layer, and said pair of right and left laminated longitudinal biasing layers each including a high coercivity ferromagnetic layer, a nonmagnetic layer and a low coercivity ferromagnetic layer having a coercivity lower than said high coercivity ferromagnetic layer, said low coercivity ferromagnetic layer and said high coercivity ferromagnetic layer being antiferromagnetically exchange-coupled, and stacked on a common side of said free magnetic layer of said magnetoresistive element.

2. The thin film head of claim 1, wherein layer thickness of said nonmagnetic layer of each of said pair of right and left laminated longitudinal biasing layers falls within a range of 0.4–3 nm.

3. The thin film head of claim 1, wherein said pinning layer of said magnetoresistive element is a laminated pinning layer formed of a plurality of mag netic layers stacked together with a nonmagnetic layer interposing therebetween.

4. The thin film head of claim 3, wherein layer thickness of said nonmagnetic layer in said laminated pinning layer is established so that magnetization direction of each of said plurality of magnetic layers facing one another via said nonmagnetic layer is opposite to each other.

5. The thin film head of claim 3, wherein layer thickness of said nonmagnetic layer in said laminated pinning layer falls within a range of 0.4–3 nm.

6. The thin film head recited in one of claims 1 through 5, wherein said free magnetic layer of said magnetoresistive element is a laminated free magnetic layer formed of a plurality of magnetic layers, adjacent magnetic layers of said plurality of magnetic layers are comprised of different low coercivity ferromagnetic materials.

7. The thin film head recited in one of claims 1 through 5, further comprising a cap layer provided between said pair of the right and the left laminated longitudinal biasing layers and making contact with the upper surface of said magnetoresistive element.

* * * * *